United States Patent
Kulaga et al.

(10) Patent No.: US 12,072,978 B2
(45) Date of Patent: Aug. 27, 2024

(54) FAST ANTIMALWARE SCAN

(71) Applicant: Acronis International GmbH, Schaffhausen (CH)

(72) Inventors: Andrey Kulaga, Istanbul (TR); Serguei Beloussov, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 272 days.

(21) Appl. No.: 17/652,285

(22) Filed: Feb. 24, 2022

(65) Prior Publication Data

US 2023/0267202 A1  Aug. 24, 2023

(51) Int. Cl.
*G06F 21/56* (2013.01)

(52) U.S. Cl.
CPC ......... *G06F 21/562* (2013.01); *G06F 21/564* (2013.01); *G06F 2221/033* (2013.01)

(58) Field of Classification Search
CPC ...... G06F 21/56; G06F 21/562; G06F 21/564; G06F 2221/033
See application file for complete search history.

(56) References Cited

U.S. PATENT DOCUMENTS

| | | | |
|---|---|---|---|
| 8,375,450 B1 | 2/2013 | Oliver et al. | |
| 9,239,922 B1 | 1/2016 | Zhu et al. | |
| 10,073,983 B1 | 9/2018 | Li et al. | |
| 10,713,361 B2 | 7/2020 | Strogov et al. | |
| 2008/0263665 A1 | 10/2008 | Ma et al. | |
| 2008/0263669 A1* | 10/2008 | Alme | G06F 21/56 726/24 |
| 2012/0159631 A1 | 6/2012 | Niemela et al. | |
| 2016/0094565 A1 | 3/2016 | Mohandas et al. | |
| 2021/0200866 A1 | 7/2021 | Strogov et al. | |

FOREIGN PATENT DOCUMENTS

| | | | | |
|---|---|---|---|---|
| CN | 104504333 A | * | 4/2015 | ............ G06F 21/56 |
| CN | 106415582 A | * | 2/2017 | ........... G06F 21/562 |
| CN | 114417335 A | * | 4/2022 | |
| WO | 2017213400 | | 12/2017 | |

\* cited by examiner

*Primary Examiner* — Jayesh M Jhaveri

(74) *Attorney, Agent, or Firm* — ESPE Legal Consultancy FZ-LLC

(57) ABSTRACT

A system for detection of files not matching a known malware file in a computing environment that includes a processor coupled to a memory storing instructions to permit the processor to function as an analyzer. The analyzer is configured to receive, as input, an unknown file and the known malware file, compare the unknown file to the known malware file by comparing N (where N is greater of equal to 1) blocks $B_1, \ldots, B_N$ of lengths $L_1, \ldots, L_N$ located at offsets $O_1, \ldots, O_N$ such that the number of blocks, lengths and offsets are calculated according to pre-defined algorithm, and output a value indicating that the unknown file is different from the known malware file if exists at least one j that a $B_j$ block of the unknown file is different from a $B_j$ block of the known malware file.

18 Claims, 3 Drawing Sheets

FAST ANTIMALWARE SCAN

TECHNICAL FIELD

The invention pertains to computer systems and the identification of files that are not known malware within the computer systems using fast antimalware scan systems and methods.

BACKGROUND

Malicious software penetrates and harms computer systems without the knowledge or consent of the owners. Malware is an ongoing problem in computer security. One of the ways to identify malware is to match a given file to a known malware file collection.

One of the traditional approaches to detect malicious programs and files is to compare the "signatures" of the files under investigation. When antivirus applications detect a new sample, they analyze it and create a "signature" that is released as an update to clients. That "signature" is added as a data element to the malware file collection.

These "signatures" are normally calculated using the contents of the entire file, and hence the entire file has to be read in order for the "signature" to be calculated.

That is, in conventional systems, the process of answering the question of whether a given file is found in a malware list includes calculating a "signature" of that file and further comparison of that "signature" to "signatures" of each of the files in the list of known malware files.

Accordingly, existing solutions in conventional systems require full sample scan to detect a malware signature.

However, antimalware scan should be as fast as possible, and should consume a minimum amount of CPU and I/O resources.

Therefore, faster and more efficient systems and methods for matching an unknown file within a computer system to a list of known malware files are needed to compensate for the ever-increasing number of known malware variants.

SUMMARY

The present invention is directed to providing a system and a method for faster detection of some of the "good" files by performing partial matching of one or more continuous byte sequences (blocks) of an unknown file to corresponding block(s) of known malware files while also minimizing the false positive (FP) rate.

The main problem with using "signatures" (e.g., cryptographic hash functions) is that each unknown file needs to be read in its entirety to calculate the "signature" that is later used to match against the "signatures" of known malware files.

This problem can be solved by using one or more continuous byte sequences (blocks) of the unknown file selected according to a certain algorithm/selection criterion to match to the corresponding continuous byte sequences (blocks) of the known malware file.

The block selection algorithm may be based on predefined number of blocks, lengths, and offsets or on dynamically calculated number of blocks, lengths, and offsets, on or any combination thereof.

The block selection algorithm may be based on prior knowledge, e.g., analysis of common blocks within a given malware family or knowledge of the internal format of a file type.

The block selection algorithm may be based on the results of the optimization process using a certain sample.

The block selection algorithm may be used as a subject of an optimization process.

The block selection algorithm may be selected using an artificial intelligence (AI) algorithm including but not limited to neural networks, heuristics, or support vector machines.

Selected blocks of the unknown file and corresponding blocks of the known malware file may be compared to each other one-by-one or in concatenated form, possibly with certain separator between blocks, by forming the "synthetic" versions of both files that are later compared to each other using one of the known file comparison algorithms, e.g., by calculating and comparing "signatures".

In case of block-by-block comparison, if at least one of the blocks of an unknown file does not match a corresponding block of the known malware file, then the unknown file is definitely different from the known malware file.

If blocks of an unknown file match corresponding blocks of the known malware file, one or more additional matching steps may be performed to make the match/no match decision.

The exemplary invention provides a system and a method for detection of files not matching a known malware file in a computing environment.

The exemplary system includes a processor (CPU) of a computer coupled to a memory storing instructions to permit the processor to function as an analyzer.

The analyzer is configured to receive as input an unknown file and a known malware file, compare the unknown file to the known malware file by comparing N (where N is greater of equal to 1) blocks $B_1, \ldots, B_N$ of lengths $L_1, \ldots, L_N$ located at offsets $O_1, \ldots, O_N$ such that the number of blocks, lengths and offsets are calculated according to a pre defined algorithm, and output a value indicating that the unknown file is different from the known malware file if exists at least one j that a $B_j$ block of the unknown file is different from a $B_j$ block of the known malware file.

The present system and method can provide an efficient matching of an unknown file within a computer system to a list of known malware files for a fast malware scan of the unknown files with various variants.

Optimization of the comparison process will be achieved under the following conditions: (1) there exists a cost function C(x) that determines the total cost of an operation, (2) selected block comparison algorithm B identifies $P_W$ percentage of files as "good", and (3) selected block comparison algorithm B identifies $(1-P_W)$ percentage of files as "requiring further check" and requiring a full-scale comparison, e.g., using a "signature" algorithm S.

Complexity of comparing an unknown file to the selected known malware file is C(S). Complexity of comparing of an unknown file to the selected known malware file using the block-level algorithm is 1*C(B)—comparison of all files using the block algorithm plus $(1-P_w)$*C(S)—checking all files that were not identified as "good" with the "signature".

Overall, the algorithm yields optimization if $C(S)>C(B)+(1-P_w)*C(S)$.

SUMMARY OF FIGURES

The exemplary aspects of the invention will be better understood from the following detailed description of the exemplary embodiments of the invention with reference to the drawings.

DETAILED DESCRIPTION

An exemplary aspect of the present invention is directed to optimize malware signatures for minimum amount of CPU and I/O resources consumption without compromising other quality metrics. It can be implemented by a two-stage scan process.

Most files will be scanned by "single read" with a fixed amount of CPU and VO resources. Few of the files require more data to decide and what needs to be scanned can be determined by content of the first read.

Figure 1:
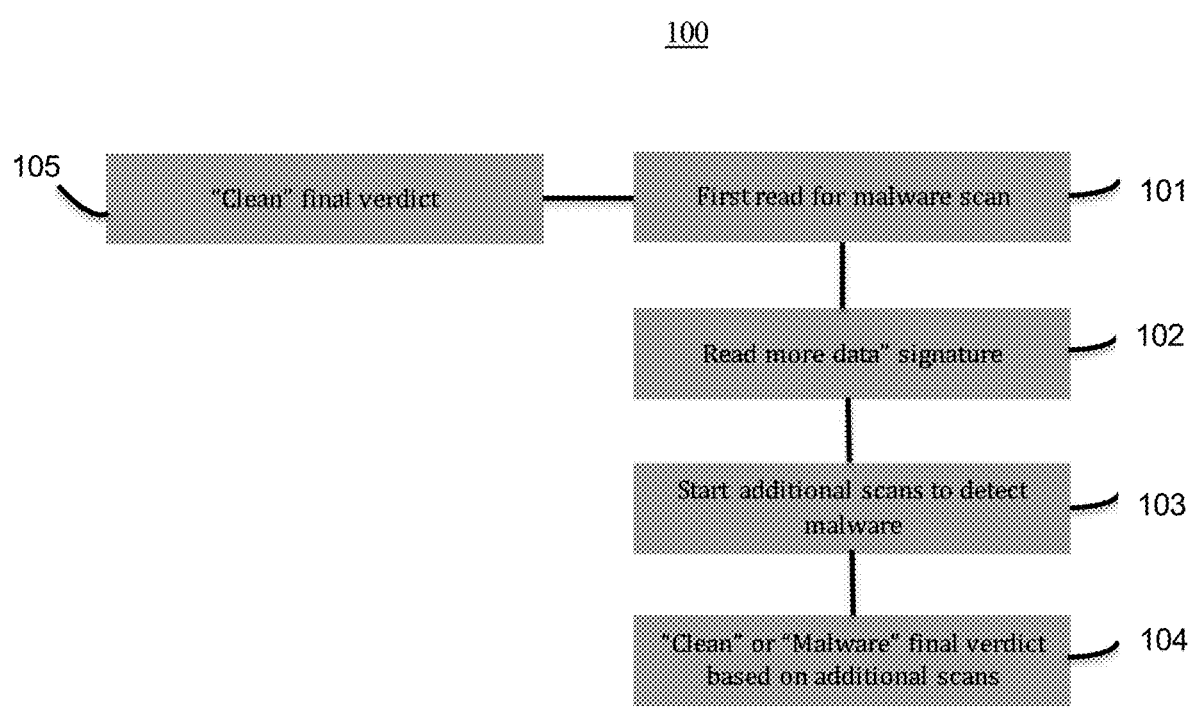
FIG. 1 shows an exemplary procedure for detection of files not matching a known malware file in a computing environment according to an exemplary embodiment.

As shown in FIG. 1, the procedure 100 starts in step 101 with a file scan of reading a fixed amount of data from a particular file. It can be, for example, 64 KB from the beginning of the file, 32 KB from the middle of the file, and 32 KB from the end of the file.

If the procedure 101 identifies that at least one of the blocks of the unknown file is different from the corresponding block of the known malware file, the procedure issues the "Clean" verdict 105, meaning that the unknown file does not match to the known malware file presented for comparison.

In a case that all blocks of the unknown file match all the corresponding blocks of the known malware file, and hence it is impossible to make a decision that files are different using the abbreviated scan, in step 102, a special "read more data" signature to antimalware database is performed to determine when more data is required to decide if the file is clean or malware.

"Read more data" is an indicator that more data and other comparison operation(s) need to be performed on the file to answer the match/no match question.

The goal of the algorithm is to make the "Read more data" to be infrequent for clean files, so these signatures do not add significant impact for scan time and average amount of resources required for scanning.

In step 103, additional scans are performed to detect malware, and "clean" and "malware" file verdicts based on the additional scans are identified in step 104.

Figure 2:
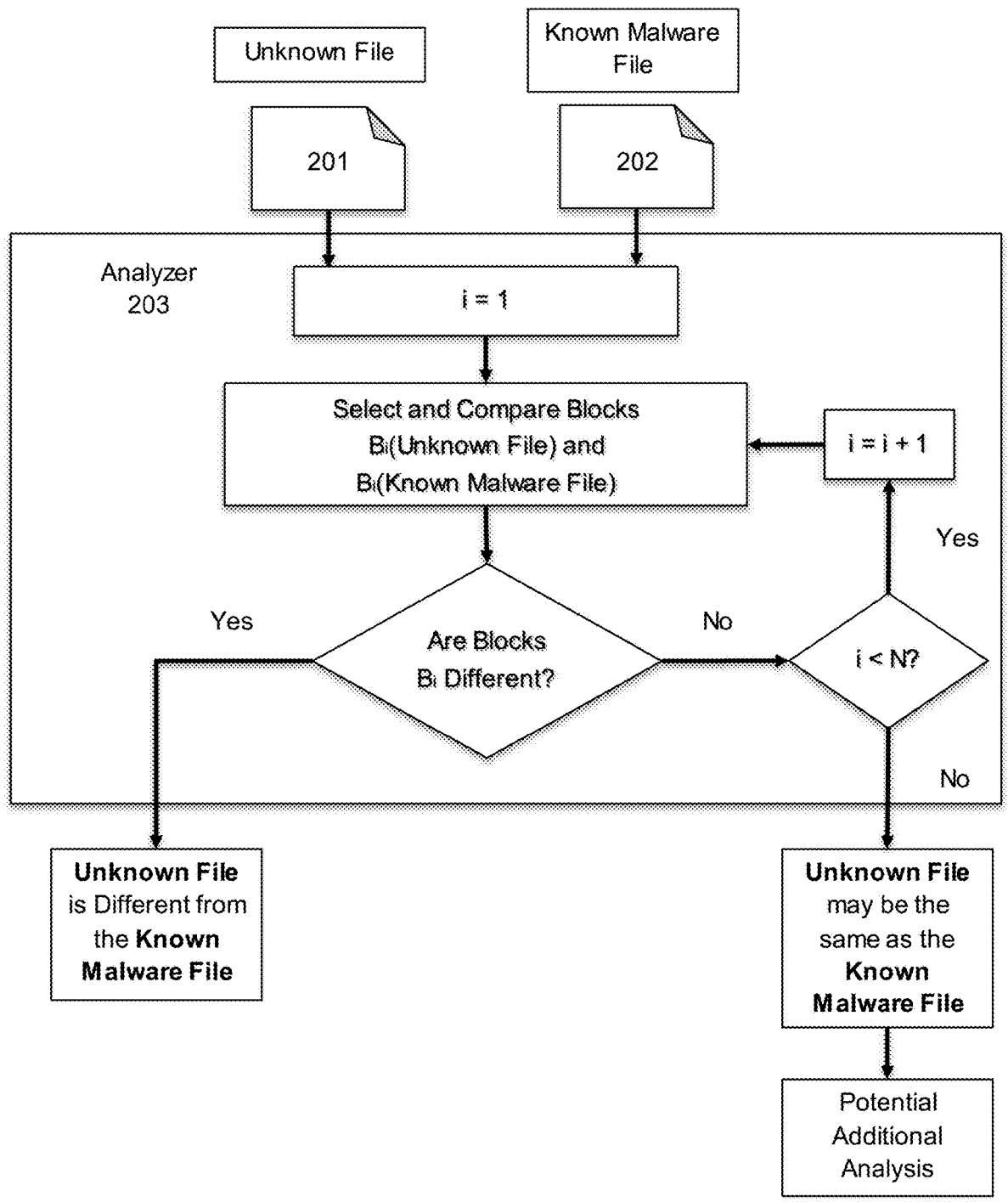
FIG. 2 shows the components and interactions of an exemplary system embodying the invention.

FIG. 2 shows an exemplary system 200 for implementing a fast antimalware scan algorithm that is applied to computer files for matching them against the list of known malware files.

The system 200 for detection of files not matching a known malware file in a computing environment includes a processor coupled to a memory storing instructions to permit the processor to function as an analyzer 203.

The analyzer 203 is configured to receive, as input, an unknown file 201 and a known malware file 202.

Analyzer 203 compares the unknown file 201 to the known malware file 202 by applying an algorithm that uses N (where N is greater or equal to 1) blocks $B_1, \ldots, B_N$ of lengths $L_1, \ldots, L_N$ located at offsets $O_1, \ldots, O_N$ such that each the number of blocks, length and offset can be calculated according to a pre-defined algorithm (e.g., X bytes from the beginning of the file, Y bytes from the middle of the file, and Z bytes before the end of the file, etc.).

To match an unknown file $F_{unknown}$ to the known malware file $F_{malware}$, the following steps are performed. For each i from 1 to N (where N is a natural number greater or equal to 1), compare blocks $B_1, \ldots, B_N$ of $F_{unknown}$ to corresponding blocks of $F_{malware}$. If there exists at least one such j between 1 and N that $B_j(F_{unknown})$ is different from $B_j(F_{malware})$ then $F_{unknown}$ is different from $F_{malware}$.

If all blocks of $F_{unknown}$ match corresponding blocks of $F_{malware}$, an additional matching step may be used to make the match/no match decision.

Algorithms may be repeated for each $F_{malware}$ file in the known malware list presented for matching.

If $F_{unknown}$ is different from each $F_{malware}$ file from the malware list presented for matching, $F_{unknown}$ may be considered not matching any of the files from the malware list presented for matching.

In an exemplary embodiment, additional matching using one or more different criteria (e.g., comparing certain file attributes such as file lengths of $F_{unknown}$ and $F_{malware}$) may be used prior to performing the block-level comparison of $F_{unknown}$ and each of the $F_{malware}$ files to determine that $F_{unknown}$ and $F_{malware}$ are different.

In an exemplary embodiment, another additional matching (e.g., calculating a "signature" of $F_{unknown}$ and comparing it to the "signature" of $F_{malware}$) using one or more different criteria may be used after performing the block-level comparison of $F_{unknown}$ and $F_{malware}$ files if all blocks of $F_{unknown}$ were found to be identical to corresponding blocks of $F_{malware}$ to make the match/no match decision.

In an exemplary embodiment, the block-level comparison algorithm may be repeated with different sets of blocks (different number of blocks and/or different size of all or some individual blocks and/or offset of all or some individual blocks).

In an exemplary embodiment, the total size of all blocks equals the size of at least one of the following "hash" functions: MD5, SHA1, or any of the SHA-2 family.

In an exemplary embodiment, 3 blocks from each file are used. First block 64 KB at the beginning of each file, second block of 32 KB in the middle of the file, and the third block—last 32 KB of the file.

In an exemplary embodiment, N blocks from each of the $F_{malware}$ files from a known malware collection are pre-calculated and stored in the list of malware files presented for matching.

In an exemplary embodiment, N blocks from each of the $F_{malware}$ files from a known malware collection are extracted from the actual known malware files presented for matching.

In an exemplary embodiment, additional information for each of the $F_{malware}$ files (e.g., "signatures") is pre-calculated and stored in the list of malware files presented for matching.

Figure 3:
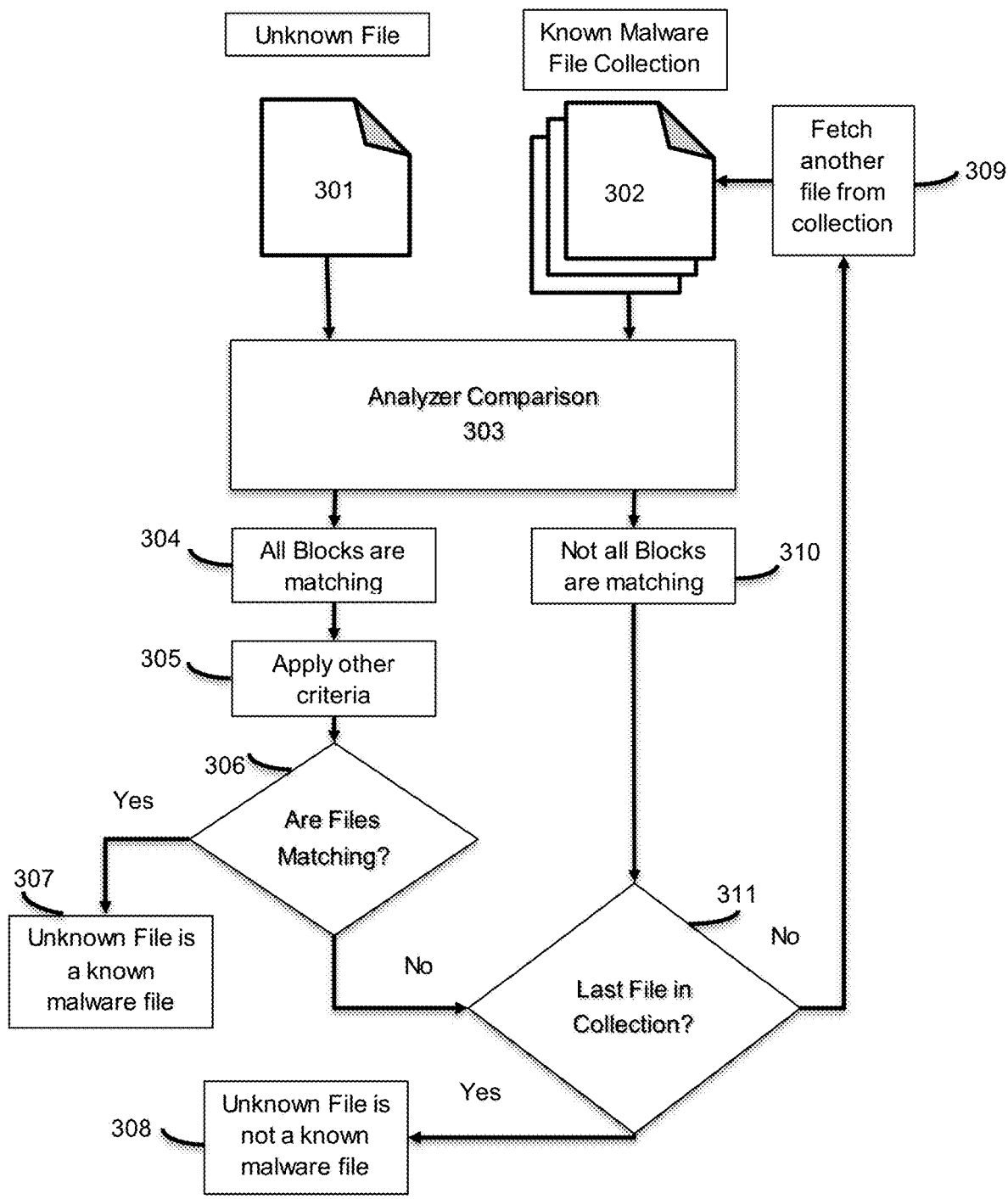
FIG. 3 shows exemplary method steps for implementing the invention to match an unknown file to a collection of known malware files.

FIG. 3 shows an exemplary method 300 for detection of files not matching a known malware file in a computing environment.

Method 300 includes receiving an unknown file 301 and a known malware file collection 302 in a processor of a computer coupled to a memory device.

The unknown file 301 and the known malware file 302 collection are compared in step 303, by an analyzer of the processor, by comparing N (where N is greater or equal to 1) blocks $B_1, \ldots, B_N$ of lengths $L_1, \ldots, L_N$ located at offsets $O_1, \ldots, O_N$ such that the number of blocks, lengths and offsets are calculated according to a pre-defined algorithm.

When all block files are matching, in step 304, the method may apply other post-comparison criteria such as comparing at least one signature of the unknown file with at least one signature of the known malware file in step 305.

In step 306, it is determined whether the known malware file collection 302 matches the unknown file 301.

When the known malware file collection 302 matches the unknown file 301, in step 307, it identifies that the unknown file is a known malware file.

When the known malware file collection 302 does not match the unknown file 301, in step 311, it is checked if the file is the last file in collection.

Further, in the comparison process 303, if all the blocks are not matching in step 310, it is checked if the file is the last file in collection in step 311.

When the file is not the last file in the collection, the iteration continues in step 309 by fetching another file for collection.

When in step 311 it is confirmed that the file is the last file in the collection, in step 308, it is determined that the unknown file. 301 is not a known malware file as the files of known malware file collection 302.

Based on the above system and method of present invention, a fast procedure to classify all files with evaluating by deeper scan by applying a two-stage approach to malware detection can be provided.

That is, a value is outputted to indicate that the unknown file 301 is different from the known malware file collection 302 if there exists at least one j, such that a $B_j$ block of the unknown file is different from a $B_j$ block of the known malware file.

The invention claimed is:

1. A system for detection of files not matching a known malware file in a computing environment, the system comprising:
a processor coupled to a memory storing instructions to permit the processor to function as an analyzer, wherein the analyzer is configured to:
receive, as input, an unknown file and the known malware file;
compare the unknown file to the known malware file by comparing N (where N is greater than 1) blocks $B_1, \ldots, B_N$, of lengths $L_1, \ldots, L_N$, located at offsets $O_1, \ldots, O_N$ of the unknown file to the corresponding blocks of the known malware file at the offsets such that a number of blocks N, the lengths and the offsets are calculated according to predefined algorithm based on malware file types, wherein each of the offsets is calculated for a first number of bytes at a beginning of a file, a second number of bytes at a middle of the file, and a third number of bytes before an end of the file; and
output a value based on the comparison, indicating that the unknown file is different from the known malware file if there exists at least one j such that 1<=i<=N and a $B_j$ block of the unknown file is different from a $B_j$ block of the known malware file.

2. The system of claim 1, wherein selected file attributes of the known file are compared to file attributes of the known malware file and, if the selected file attributes of the known file are not the same as the file attributes of the known malware file, a decision is made that the unknown file is different from the malware file.

3. The system of cairn 1, wherein the analyzer compares the unknown file to every file in a malware fife collection comprising the known malware file.

4. The system of claim 1, wherein the analyzer outputs the value indicating that the unknown file is different from every file in the malware file collection.

5. The system of claim 1, wherein, before the analyzer determines if the unknown file is different from the known malware file, the processor is configured to perform a pre-comparison of the unknown file with the known malware file.

6. The system of claim 4, wherein the pre-comparison comprises comparing a file size of the unknown file to a file size of the known malware file.

7. The system of claim 5, wherein, after that the analyzer determines if the unknown file is different from the known malware file, the processor is further configured to perform a post-comparison.

8. The system of claim 6, wherein the post-comparison comprises comparing at least one signature of the unknown file with at least one signature of the known malware file.

9. The system of claim 1, wherein, after that the analyzer determines if the unknown file is different from the known malware file, the processor is further configured to perform a post-comparison.

10. The system of claim 8, wherein the post-comparison comprises comparing at least one signature of the unknown file with at least one signature of the known malware file.

11. The system of claim 1, wherein blocks are strings comprising sequences of bytes or characters within the file that end with one or more specific bytes or characters used within a given file as an indicator of "end of the line" or "carriage return".

12. The system of claim 1, wherein blocks are selected based on a known file format.

13. The system of claim 1, wherein blocks of the unknown file are compared to corresponding blocks of the known malware file one-by-one.

14. The system of claim 1, wherein selected blocks of the unknown file and corresponding blocks of the known malware file are concatenated in two "synthetic" A files that are later compared using one of known file comparison algorithms.

15. A method for detection of files not matching a known malware file in a computing environment, the method comprising:
receiving an unknown file and the known malware file;
comparing the unknown file to the known malware file by comparing N (where N is greater than 1) blocks $B_1, \ldots, B_N$, of pre-defined lengths $L_1, \ldots, L_N$, located at offsets $O_1, \ldots, O_N$ of the unknown file to the corresponding blocks of the known malware file at the offsets such that a number of blocks N, the lengths and the offsets are calculated according to predefined algorithm based on malware file types, wherein each of the offsets is calculated for a first number of bytes at a beginning of a file, a second number of bytes at a middle of the file, and a third number of bytes before an end of the file; and
outputting a value based on the comparison, indicating that the unknown file is different from the known malware file if there exists at least one j such that 1<=i<=N and a $B_j$ block of the unknown file is different from a $B_j$ block of the known malware file.

16. The method of claim 15, wherein certain file attributes of the known file are compared to file attributes of the known malware file and, if the certain file attributes of the known file are not the same as the file attributes of the known malware file, a decision is made that the unknown file is different from the malware file.

17. The method of claim 15, wherein, in the step of comparing further comprises comparing the unknown file to every file in a malware file collection comprising the known malware file.

18. The method of claim 17, wherein the step of outputting further comprises outputting the value indicating that the unknown file is different from every file in the malware file collection.

* * * * *